(12) United States Patent
Matsumura et al.

(10) Patent No.: US 12,174,143 B2
(45) Date of Patent: Dec. 24, 2024

(54) ELECTROPHORESIS DEVICE

(71) Applicant: HITACHI HIGH-TECH CORPORATION, Tokyo (JP)

(72) Inventors: Jin Matsumura, Tokyo (JP); Ayaka Okuno, Tokyo (JP); Ryusuke Kimura, Tokyo (JP); Takashi Anazawa, Tokyo (JP); Michiru Fujioka, Tokyo (JP); Wataru Sato, Tokyo (JP); Taro Nakazawa, Tokyo (JP); Motohiro Yamazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 808 days.

(21) Appl. No.: 17/272,698

(22) PCT Filed: Oct. 29, 2018

(86) PCT No.: PCT/JP2018/040041
§ 371 (c)(1),
(2) Date: Mar. 2, 2021

(87) PCT Pub. No.: WO2020/089958
PCT Pub. Date: May 7, 2020

(65) Prior Publication Data
US 2021/0356426 A1 Nov. 18, 2021

(51) Int. Cl.
*G01N 27/447* (2006.01)
(52) U.S. Cl.
CPC . *G01N 27/44726* (2013.01); *G01N 27/44791* (2013.01)
(58) Field of Classification Search
CPC ....... G01N 27/44726; G01N 27/44791; G01N 27/44708; G01N 27/44782; G01N 27/44704; G01N 27/447
See application file for complete search history.

(56) References Cited

U.S. PATENT DOCUMENTS

2002/0003091 A1* 1/2002 Kojima ............ G01N 27/44704
204/603
2003/0102221 A1* 6/2003 Ozawa ............. G01N 27/44704
204/603
(Continued)

FOREIGN PATENT DOCUMENTS

JP 2003-166976 A 6/2003
JP 2006-337278 A 12/2006
(Continued)

OTHER PUBLICATIONS

International Search Report of PCT/JP2018/040041 dated Jan. 29, 2019.

*Primary Examiner* — James Lin
*Assistant Examiner* — Sommer Yousef Osman
(74) *Attorney, Agent, or Firm* — MATTINGLY & MALUR, PC

(57) ABSTRACT

Provided is an electrophoresis device for enhancing its analysis performance. In order to achieve the task, the electrophoresis device includes a capillary array constituted by a capillary, a capillary head for bundling an end of the capillary, an electrode holder for holding an electrode provided at the other end of the capillary and a detector provided for the capillary, a first heater for heating the capillary, and an irradiation detection unit for irradiating a light to the detector to detect a fluorescence generated from a fluorescence labelled sample in the capillary. The electrophoresis device further includes a second heater for heating the detector.

13 Claims, 17 Drawing Sheets

(56) References Cited

U.S. PATENT DOCUMENTS

| | | |
|---|---|---|
| 2007/0278101 A1 | 12/2007 | Gomi et al. |
| 2008/0110757 A1 | 5/2008 | Lee et al. |
| 2011/0290648 A1 | 12/2011 | Majlof et al. |
| 2016/0290962 A1 | 10/2016 | Asogawa et al. |
| 2018/0196001 A1* | 7/2018 | Okuno ............. G01N 27/44704 |
| 2019/0041359 A1* | 2/2019 | Nakazawa ....... G01N 27/44713 |

FOREIGN PATENT DOCUMENTS

| | | | |
|---|---|---|---|
| JP | 2007-322367 A | 12/2007 | |
| JP | 2013-533468 A | 8/2013 | |
| WO | 2014/148193 A1 | 9/2014 | |
| WO | WO-2017002239 A1 * | 1/2017 | ........... G01N 27/447 |
| WO | WO-2017158811 A1 * | 9/2017 | ........... G01N 27/447 |

\* cited by examiner

ELECTROPHORESIS DEVICE

TECHNICAL FIELD

The present invention relates to an electrophoresis device.

BACKGROUND ART

Recently, application of DNA analysis has been rapidly diversified from the research subject to the clinical application field like hospital. The DNA analysis has been implemented by the process for separating DNA fragment through electrophoresis. The process has been employed for criminal investigations, determination of blood relationship, and disease diagnosis.

Patent Literature 1 discloses the electrophoresis device including a multi-capillary array with a detector for reducing temperature dispersion between capillaries, a voltage application mechanism for applying voltage to a current application path which includes a sample introducing unit and the detector, a thermostat chamber for partially or entirely storing a section derived from removing the sample introducing unit from the multi-capillary array, a first buffer container for storing first buffer solution in which the sample introducing unit is immersed, a first temperature control mechanism for adjusting temperature of the first buffer solution, and a second temperature control mechanism for adjusting temperature of the detector.

Patent Literature 2 discloses the electrophoresis device provided with the capillary array having a capillary and an optical detector for optically detecting the sample subjected to electrophoresis in the capillary, the thermostat chamber device including a main body frame and a door frame for storing the capillary array so that the capillary is held at the constant temperature, the temperature control member having a hole, which is attached to the main body frame, an optical detector holder disposed in the hole of the temperature control member for holding the optical detector, and the optical detector holder cover for pressing the optical detector held in the detector. The optical detector holder cover is provided with the temperature propagation member that comes in contact with the temperature control member.

CITATION LIST

Patent Literature

Patent Literature 1: Japanese Unexamined Patent Publication No. 2003-166976
Patent Literature 2: Japanese Unexamined Patent Publication No. 2007-322367

SUMMARY OF INVENTION

Technical Problem

In order to enhance analysis performance of the electrophoresis device, it is necessary to heat the capillary at an appropriate temperature.

In Patent Literature 1, the second temperature control mechanism heats a periphery of the detector. However, the temperature control of the detector is not executed. In Patent Literature 2, the temperature propagation member transfers heat of the temperature control member to the optical detector. However, the temperature propagation member fails to perform sufficient temperature adjustment.

It is an object of the present invention to enhance the analysis performance of the electrophoresis device.

Solution to Problem

In order to achieve the above-described object, the present invention provides an electrophoresis device which includes a capillary array constituted by a capillary, a capillary head for bundling an end of the capillary, an electrode holder for holding an electrode provided at the other end of the capillary and a detector provided for the capillary, a first heater for heating the capillary, and an irradiation detection unit for irradiating a light to the detector to detect a fluorescence generated from a fluorescence labelled sample in the capillary. The electrophoresis device further includes a second heater for heating the detector.

Advantageous Effects of Invention

The present invention ensures to enhance the analysis performance of the electrophoresis device.

DESCRIPTION OF EMBODIMENTS

Embodiments of the present invention will be described with reference to the drawings.

First Example

Figure 1:
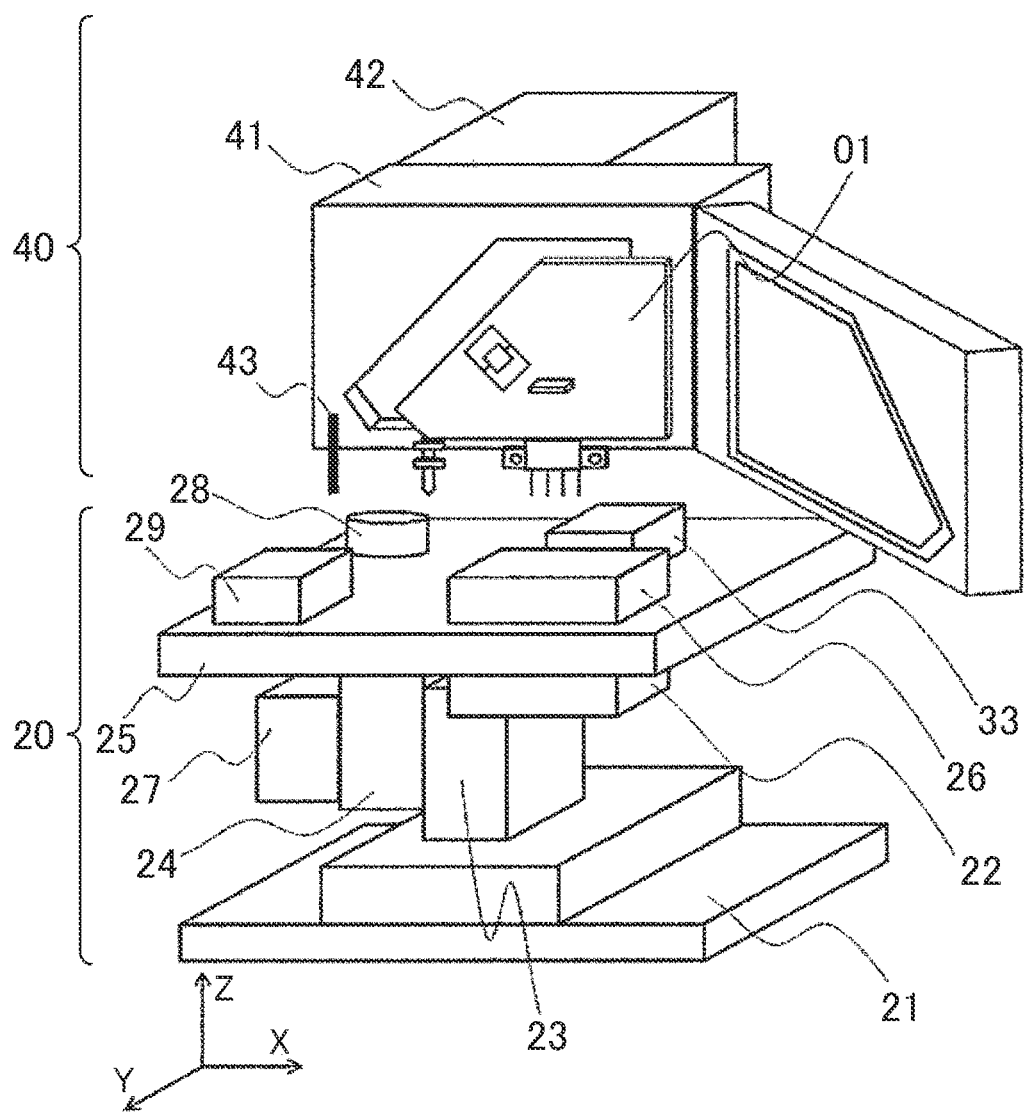
FIG. 1 schematically illustrates a structure of a capillary electrophoresis device.

FIG. 1 illustrates a structure of a capillary electrophoresis device of a first example. The device may be mainly divided into two units, that is, an irradiation detection/thermostat chamber unit 40 at an upper section of the device, and an autosampler unit 20 at a lower section of the device.

The autosampler unit 20 has a Y-axis driver 23 mounted on a sampler base 21. The Y-axis driver 23 has a Z-axis driver 24 mounted thereon. A sample tray 25 is placed above the Z-axis driver 24. This structure allows the Y-axis driver 23 and the Z-axis driver to drive the sample tray in Y-axis and Z-axis directions, respectively. An electrophoresis medium container 28, an anode-side buffer solution container 29, a cathode-side buffer solution container 33, and a sample container 26 are set on the sample tray 25 by a user. The sample container 26 on the sample tray 25 is set above an X-axis driver 22. The sample container 26 can only be driven along the X-axis on the sample tray 25. The Z-axis driver 24 also has a liquid feeding mechanism 27 which is disposed below the electrophoresis medium container 28.

The irradiation detection/thermostat chamber unit 40 is mainly constituted by a thermostat chamber unit 41 and an irradiation detection unit 42. The thermostat chamber unit 41 is capable of keeping the inner temperature constant. The irradiation detection unit 42 as an irradiation detector is disposed behind the thermostat chamber unit 41. The user sets a capillary cartridge 01 to be described later in detail so as to be fixed in the thermostat chamber unit 41. In the thermostat chamber unit 41, the fluorescence labelled sample is subjected to electrophoresis while having the capillary temperature kept constant so that the fluorescence for labelling the sample is detected in the irradiation detection unit 42. The thermostat chamber unit 41 also includes an electrode (anode) 43 to be grounded upon high voltage application for electrophoresis. As described above, the electrophoresis medium container 28, the anode-side buffer solution container 29, the cathode-side buffer solution container 33, and the sample container 26 may be driven by the autosampler unit 20 in the Y-Z axis direction. The sample container 26 can only be driven along the X-axis. The autosampler unit 20 enables the electrophoresis medium container 28, the anode-side buffer solution container 29, the cathode-side buffer solution container 33, and the sample container 26 to be optionally and automatically connected to the capillary in the capillary cartridge 01 fixed in the thermostat chamber unit 41.

Figure 2:
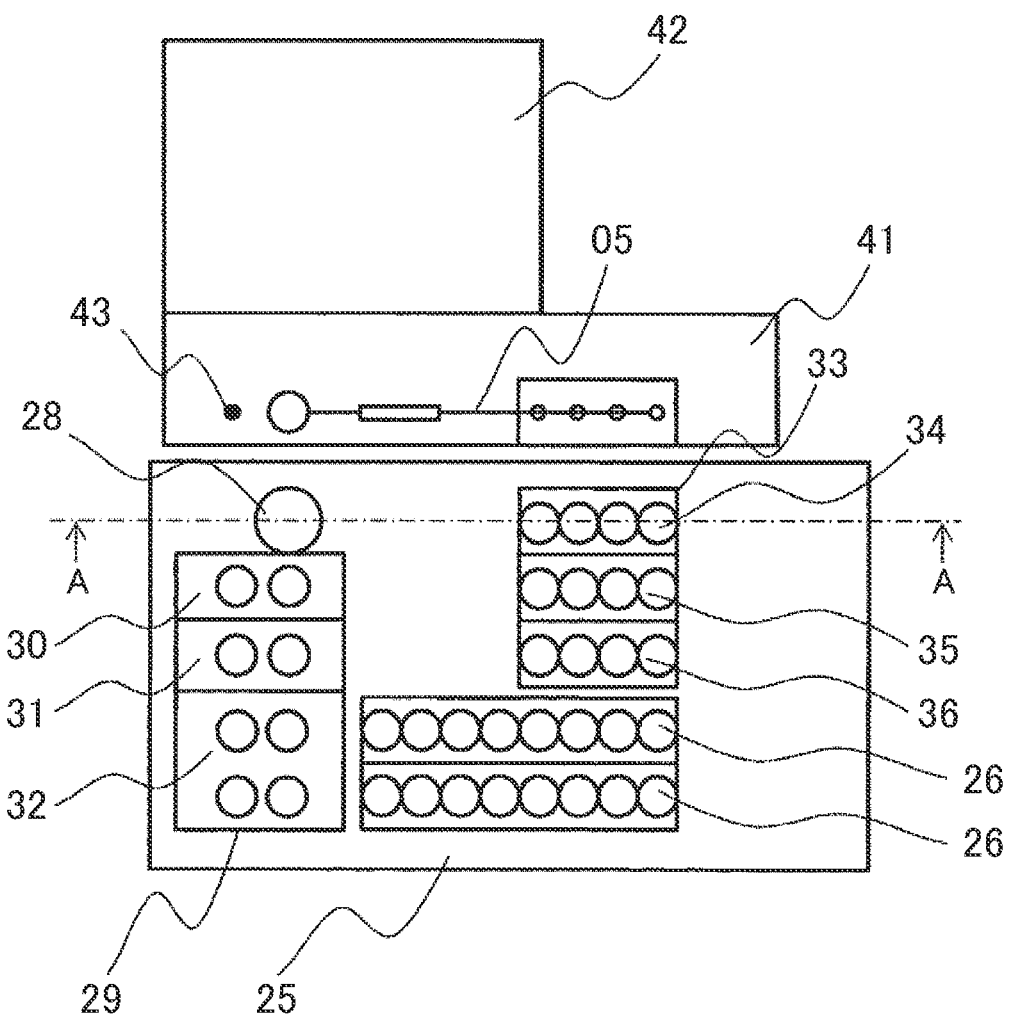
FIG. 2 is a plan view of the capillary electrophoresis device.

FIG. 2 is a plan view of the capillary electrophoresis device as illustrated in FIG. 1. The anode-side buffer solution container 29 set on the sample tray 25 includes an anode-side washing tank 30, an anode-side electrophoresis buffer solution chamber 31, and an anode-side sample introduction buffer solution chamber 32. The cathode-side buffer solution container 33 includes a waste liquid tank 34, a cathode-side washing tank 35, and a cathode-side electrophoresis buffer solution chamber 36.

The electrophoresis medium container 28, the anode-side buffer solution container 29, the cathode-side buffer solution container 33, and the sample container 26 are arranged while being in positionally related with one another as illustrated in the drawing. Specifically, the anode-side members and the cathode-side members are positionally related upon connection to the capillary 05 in the thermostat chamber unit 41 to establish the correspondence between, for example, "electrophoresis medium container 28 and waste liquid tank 34", "anode-side washing tank 30 and cathode-side washing tank 35", "anode-side electrophoresis buffer solution chamber 31 and cathode-side electrophoresis buffer solution chamber 36", and "anode-side sample introduction buffer solution chamber 32 and sample container 26".

Figure 3:
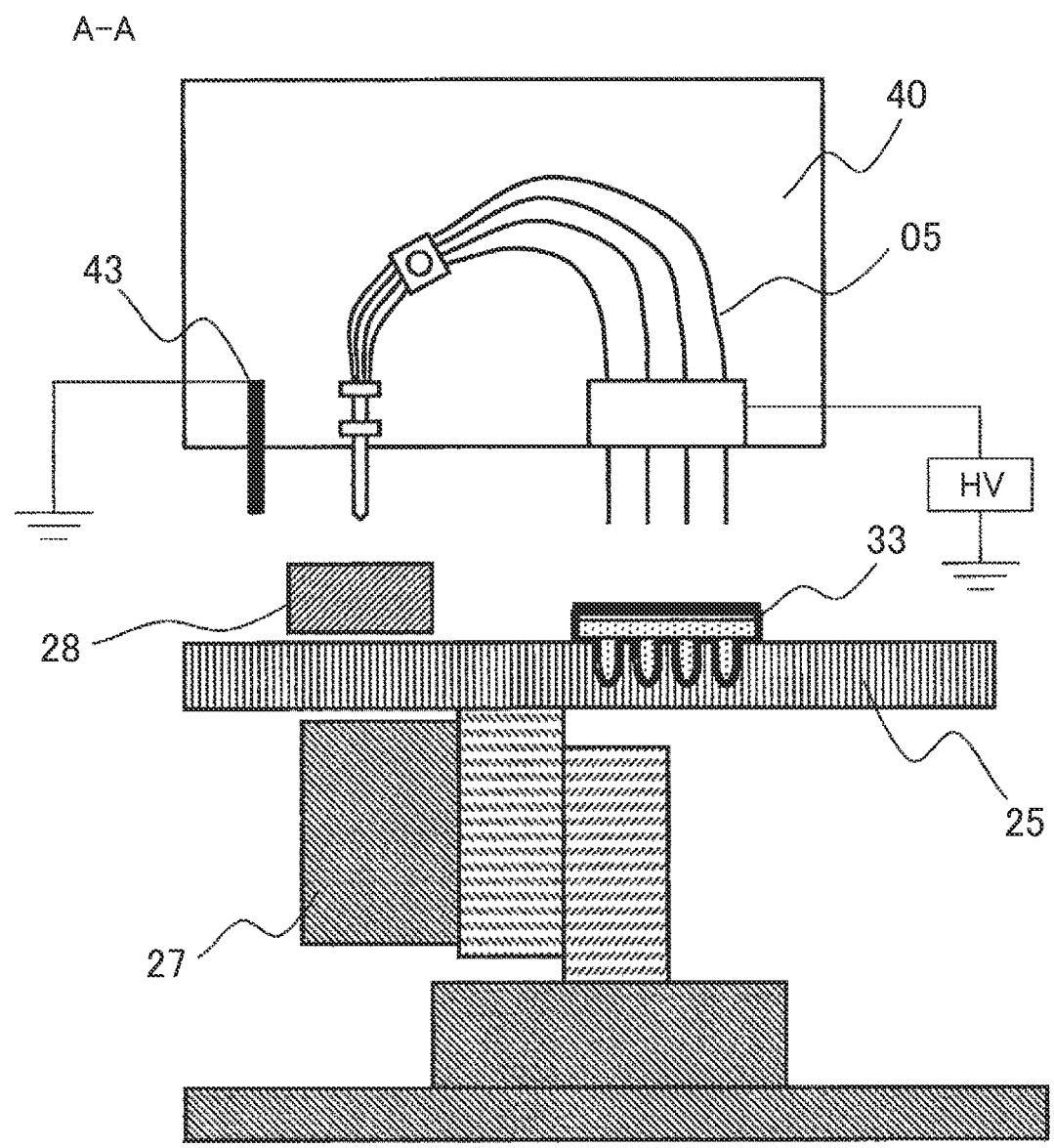
FIG. 3 is a sectional view of the capillary electrophoresis device taken along line A-A.

FIG. 3 is a sectional view taken along line A-A of FIG. 2. The electrophoresis medium container 28 is set on the sample tray 25. The liquid feeding mechanism 27 is disposed to have its built-in plunger positioned below the electrophoresis medium container 28.

Upon electrophoresis, the right side of the capillary 05 of FIG. 3 becomes the cathode side, and the left side becomes the anode side. The sample tray 25 moves so that the anode side and the cathode side of the capillary are positioned corresponding to the "anode-side electrophoresis buffer solution chamber 31 and cathode-side electrophoresis buffer solution chamber 36". High voltage is applied to the capillary 05 at the cathode side, leading to GND at the electrode (anode) 43 via the cathode-side buffer solution container 33 and the anode-side buffer solution container 29 to conduct the electrophoresis. The irradiation detection/thermostat chamber unit 40 may be configured to be movable by fixing the position of the sample tray 25.

Figure 4A:
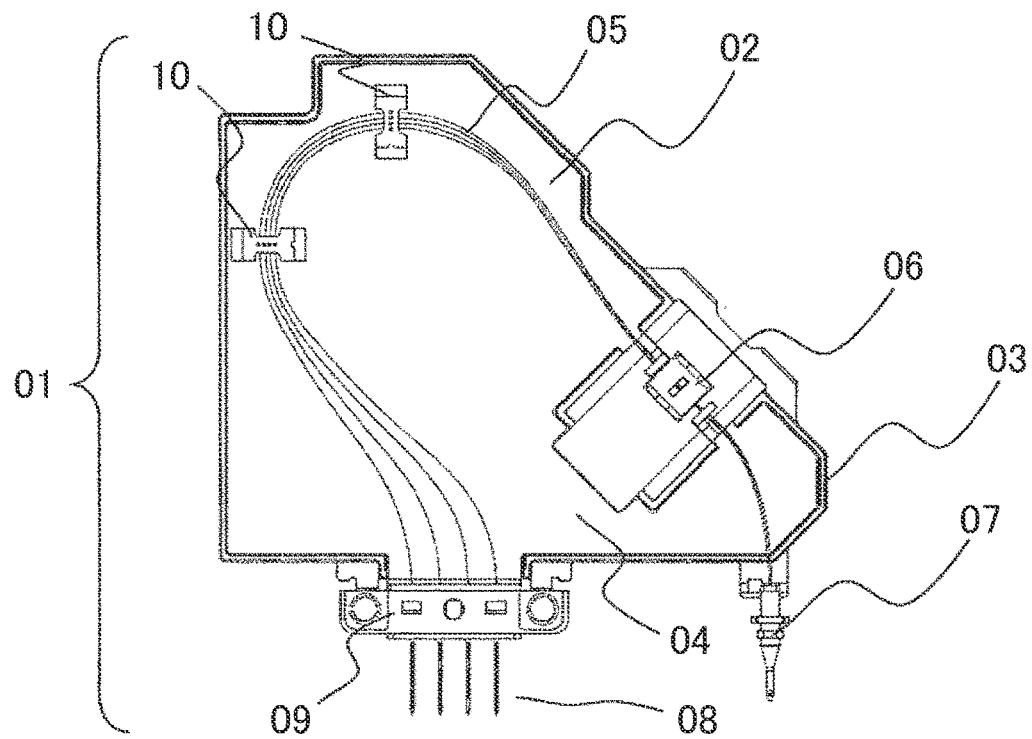
FIG. 4A illustrates a structure of a capillary cartridge when seen from a capillary side.
Figure 4B:
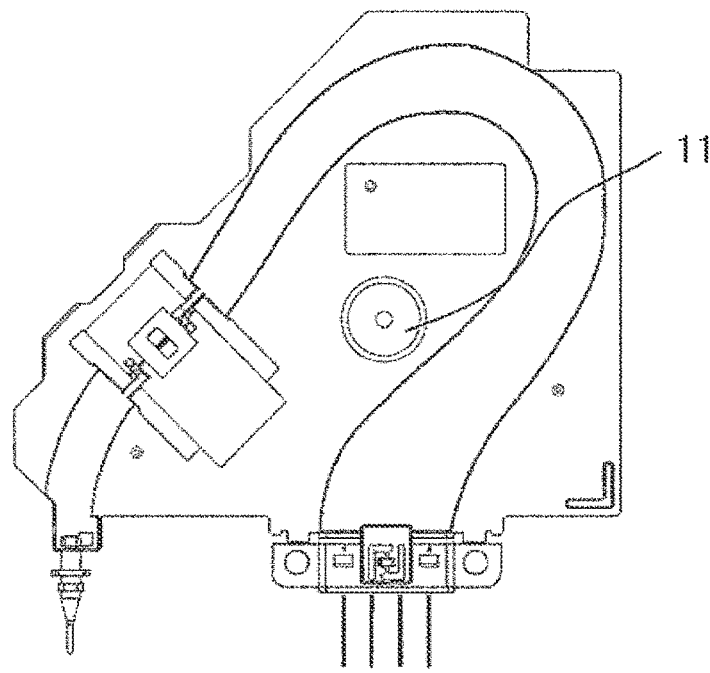
FIG. 4B illustrates a structure of the capillary cartridge when seen from a holder side.

FIG. 4A schematically illustrates a structure of the capillary cartridge of the example. The capillary cartridge 01 is constituted by a capillary array 02 including the capillary 05, a detector 06, a capillary head 07, an electrode (cathode) 08, and an electrode holder 09, a separator 10, a support 03, a sheet 04, and a holder 11 (see FIG. 4B). In the drawing, the electrode (cathode) 08 is held with the electrode holder 09. The electrode (cathode) 08 may be directly fixed to the support 03. Referring to the capillary cartridge 01 of the drawing, the support 03 provided with the holder 11, the sheet 04, and the capillary array 02 are arranged in the order from the near side of FIG. 4.

The respective components will be described. The capillary 05 refers to a pinching flow path coated for shading and keeping the strength, which may be in the form of a quartz glass tube coated with polyimide, having its inner diameter of approximately 50 μm. The tube is filled with electrophoresis medium so as to serve as an electrophoresis path for electrophoresis separation of the sample. The capillary head 07 is an end portion where the capillaries 05 are bundled and held, serving as a charging/discharging end of the phoresis medium. The separator 10 has holes by the number equivalent to the number of the capillaries 05. The inner diameter of the hole is slightly larger than the inner diameter of the capillary 05 so that the single capillary 05 passes through each of the holes correspondingly. In this manner, the capillaries 05 are individually separated to prevent tangling and crowding with one another, and then bundled into close contact state. The separator 10 is a sealing member having one adhesive surface, and bonded to the sheet 04 while allowing passage of the capillary 05 so that the capillary 05 is positioned on the sheet 04. It is preferable to use the thin, soft material for forming the separator 10 so as not to interrupt fixation of the capillary cartridge to the thermostat chamber unit 41. For example, silicon rubber, paper, and film may be employed for making the separator 10. The number of the separators 10 may be increased or decreased in accordance with the length of the capillary 02.

The number of the electrodes (cathodes) 08 corresponds to the number of the capillaries 05. Voltage application to the electrodes allows the charged sample to be introduced into the capillaries 05 so that electrophoresis separation is conducted for each molecular size. The electrode (cathode) 08 is a stainless-steel pipe with inner diameter ranging from approximately 0.1 to 0.5 mm, and allows insertion of the capillary 05. The detector 06 is provided above the capillaries 05 which are arranged planarly with constant accuracy. The detector 06 is disposed at a location for detecting the fluorescence of the sample passing through the capillary 05. It is necessary to align the detector with the position of the detection system of the device with high accuracy.

Preferably, the sheet 04 exhibits soft cushioning properties. The use of the cushioning material ensures to prevent damage to the capillary 05. The use of heat insulation material and heat radiation materials for producing the sheet 04 provides the heat insulating performance or heat radiating performance. For example, foamed plastics such as polyurethane foam and polyethylene, and fibrous material such as glass wool may be used as the heat insulation material. Rubber such as silicon, elastomer, and heat dissipation gel may be used as the heat radiation material.

Figure 5A:
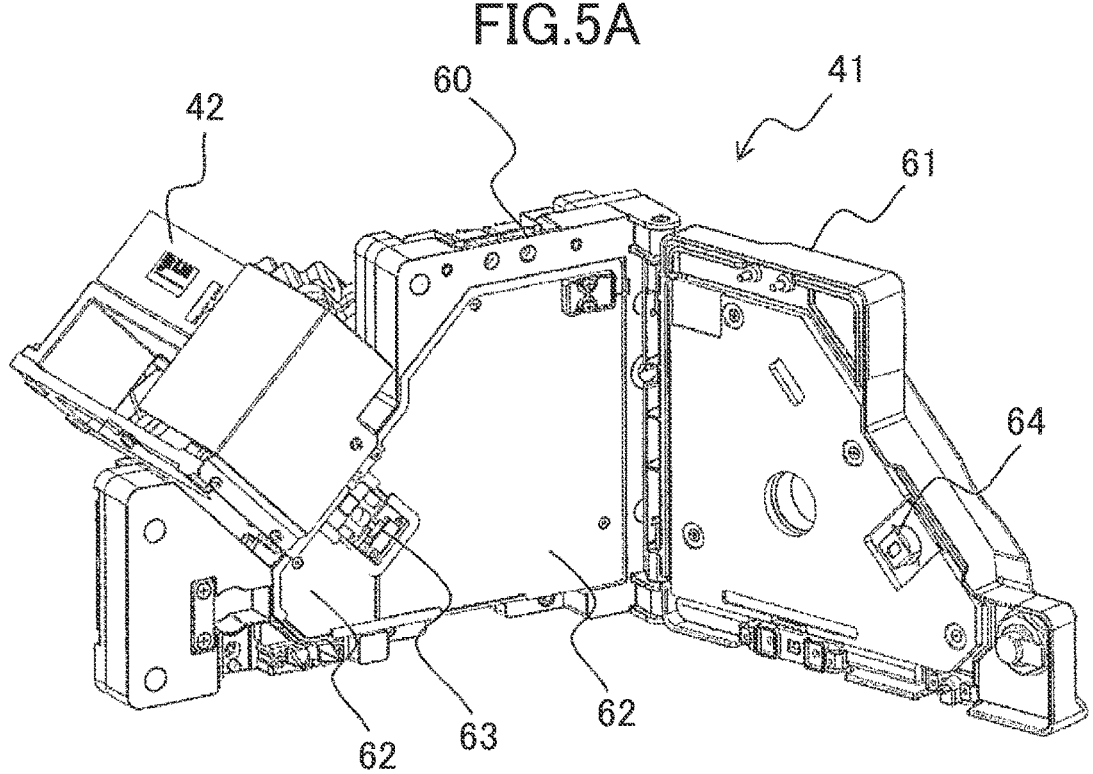
FIG. 5A illustrates a structure of a thermostat chamber.

FIG. 5A illustrates an example of the thermostat chamber unit 41. As FIG. 5A illustrates, the thermostat chamber unit 41 includes a thermostat chamber base 60 and a thermostat chamber door 61. The thermostat chamber base 60 includes a first temperature control unit 62 for temperature control of the capillary 05. The first temperature control unit 62 has a notch 63. The irradiation detection unit 42 is disposed on the notch 63. The thermostat chamber door 61 includes a second temperature control unit 64 for temperature control of the detector 06 of the capillary. The first temperature control unit 62 and the second temperature control unit 64 will be described later in detail.

Figure 5B:
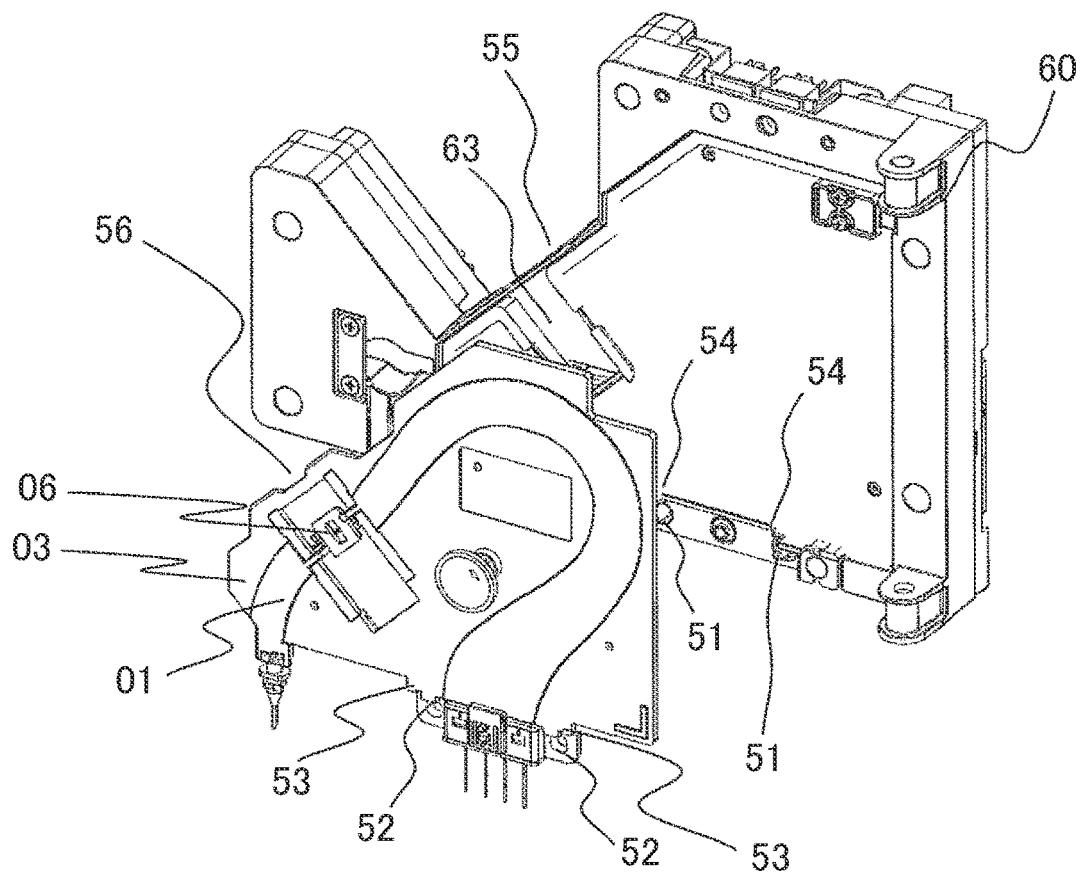
FIG. 5B illustrates a structure of the thermostat chamber onto which the capillary cartridge is to be installed.

An example of installation of the capillary cartridge 01 onto the thermostat chamber base 60 will be described referring to FIG. 5B. A protruding portion as an insert 56 formed in the support 03 is inserted into an opening as support insert port 55 formed in the thermostat chamber base 60. At the same time, a support leg 53 of the support is placed on a support stage 54 formed on the thermostat chamber base 60 while having an electrode holder positioning hole 52 engaged with an electrode holder positioning pin 51 of the thermostat chamber base 60 so that the capillary cartridge 01 is installed. Insertion of the support 03 prevents the capillary cartridge 01 from lifting as a result of one-side abutment of the inserted support 03 when closing the thermostat chamber door 61. Closing of the thermostat chamber door 61 serves to press and fix the capillary cartridge 01 to the heater 62 as an installation surface.

Figure 5C:
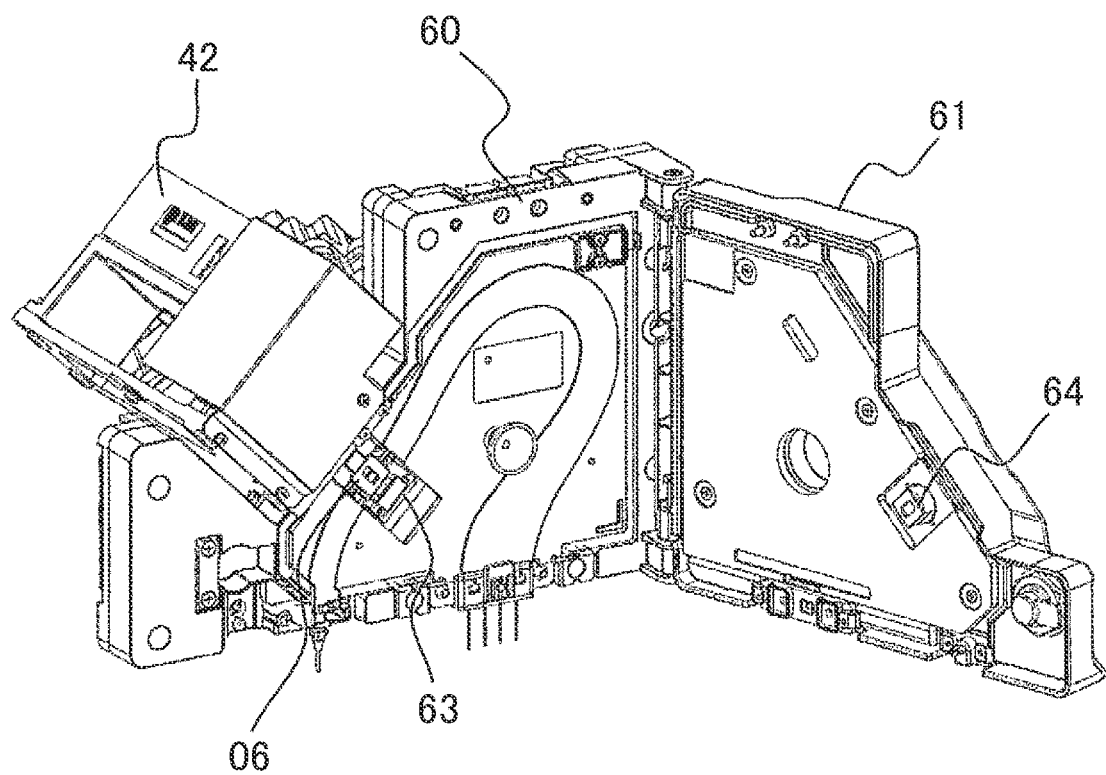
FIG. 5C illustrates a structure of the thermostat chamber onto which the capillary cartridge has been installed.

Referring to FIG. 5C, an explanation will be made with respect to a state after installation of the capillary cartridge 01 onto the thermostat chamber base 60 in detail. The detector 06 of the capillary is at the location where the fluorescence in the capillary 05 is detected by the irradiation detection unit 42. Accordingly, the detector 06 is disposed to come in contact with the irradiation detection unit 42. Therefore, the detector 06 of the capillary is located in the notch 63 of the first temperature control unit on which the irradiation detection unit is disposed. The detector 06 of the capillary does not come in contact with the first temperature control unit 62, and is not directly heated thereby. Furthermore, as the detector 06 comes in contact with the irradiation detection unit 42, heat is likely to be discharged to lower the temperature. The resultant lowering of the temperature of the detector 06 affects the phoretic performance. The example is characterized by the second temperature control unit 64 for heating the detector 06. The second temperature control unit 64 directly comes in contact with the detector 06 around which the capillaries are arranged so that the detector 06 is heated. This allows temperature control of the detector 06 to enhance the phoretic performance. The second temperature control unit 64 is attached to the thermostat chamber door 61 to be arranged simultaneously with closing operation of the thermostat chamber door 61. This may easily attach the second temperature control unit 64. The second temperature control unit 64 performs a function for pressing the detector 06 to the irradiation detection unit 42 so that the detector 06 is positioned.

The structure of the second temperature control unit 64 for performing the above-described operation will be described referring to FIGS. 6A, 6B and 6C.

Figure 6A:
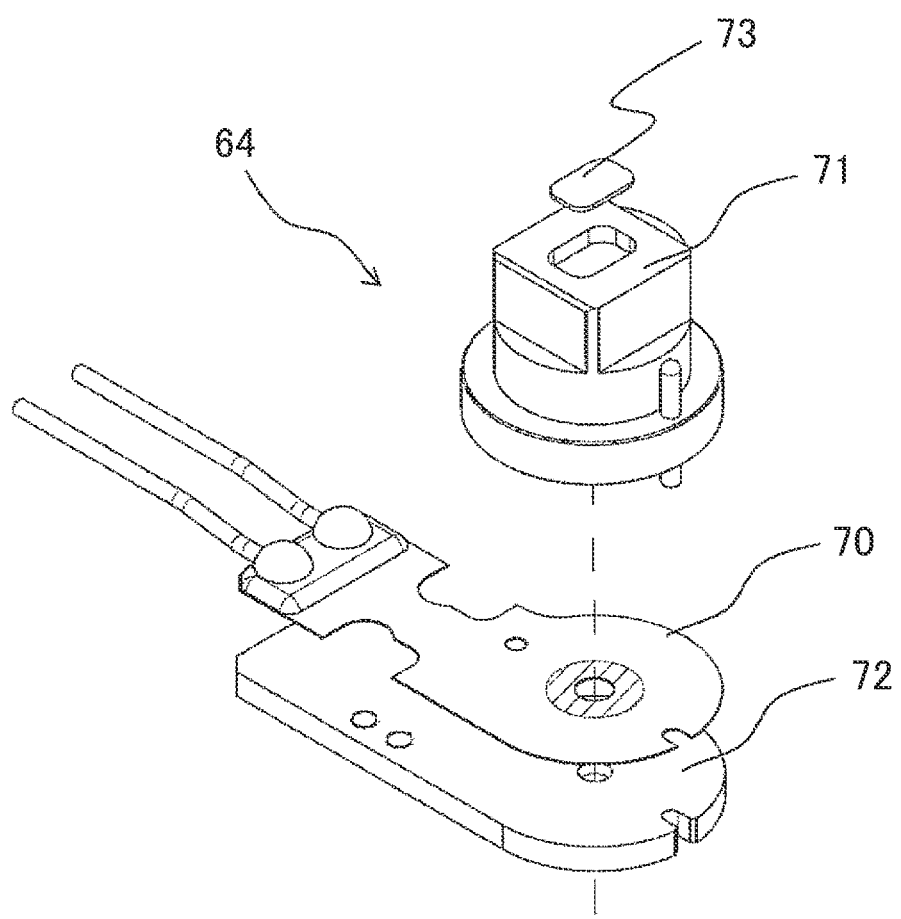
FIG. 6A illustrates a structure of a second temperature control unit.
Figure 6B:
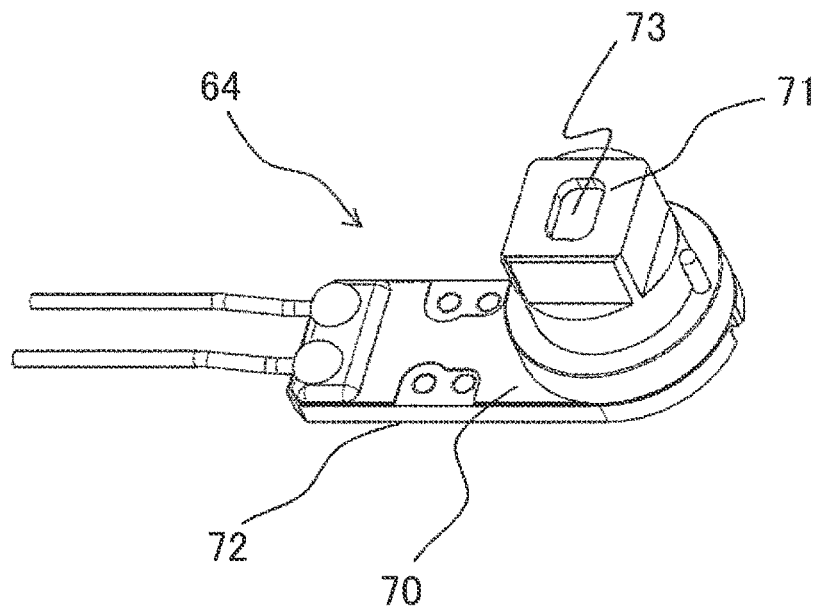
FIG. 6B illustrates an example of the second temperature control unit.

FIG. 6A illustrates a structure of the second temperature control unit 64. The second temperature control unit 64 includes a heater 70, a presser block 71 for transferring heat of the heater 70 to the detector 06, a base plate 72 on which the heater 70 is mounted, and an antireflection sheet 73. FIG. 6B illustrates an assembled structure of the second temperature control unit 64. The second temperature control unit 64 is attached to the thermostat chamber door 61 to be closed in direct contact with the detector 06 of the capillary. The second temperature control unit 64 executes temperature control of the detector 06 from the direction opposite the one in which the irradiation detection unit 42 detects the fluorescence. The second temperature control unit 64 propagates heat of the heater 70 to the presser block 71 in contact with the detector 06 for temperature control thereof. Preferably, the contact area between the presser block 71 and the detector 06 is substantially equivalent to the area of the detector 06 for efficient heat transfer. Preferably, the presser block 71 is made of the high heat conductive material such as aluminum and copper. Preferably, the presser block 71 is provided with the antireflection sheet 73. If the antireflection sheet 73 is not provided, the fluorescence emitted from the sample passing through the capillary 05 is reflected by the presser block 71. When the reflected fluorescence reaches the detector 06, the problem of increasing background noise may occur, resulting in deterioration of detection accuracy. The use of the antireflection sheet 73 ensures to alleviate the problem of increased background noise. Preferably, the presser block 71 is colored in black or the like for the purpose of reducing the reflection.

Figure 6C:
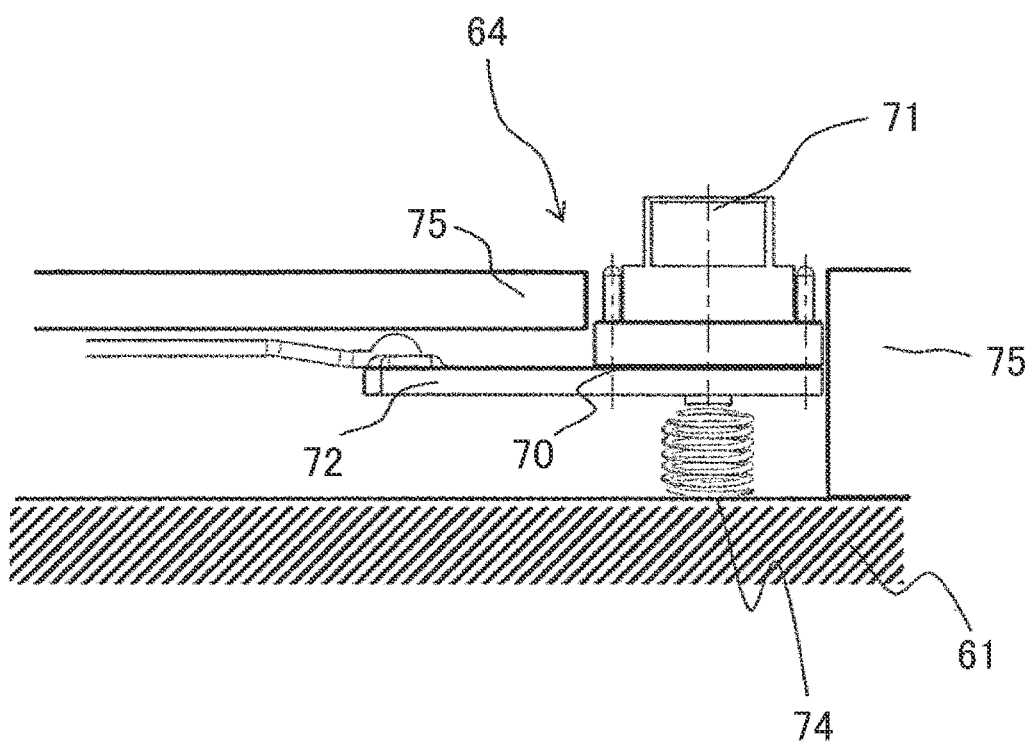
FIG. 6C is a side view of the second temperature control unit.

FIG. 6C illustrates the second temperature control unit 64 attached to the thermostat chamber door 61. A spring 74 is disposed between the second temperature control unit 64 and the thermostat chamber door 61.

The thermostat chamber door 61 is provided with a guide 75 to surround the second temperature control unit 64 and the spring 74. The guide 75 allows the spring 74 to move the second temperature control unit 64 only in the predetermined direction. The thermostat chamber door 61 is provided with the guide 75 as an individual member as indicated by FIG. 6C. However, the thermostat chamber door 61 may be configured to perform the function of the guide 75. When closing the thermostat chamber door 61, the second temperature control unit 64 is pressed to the detector 06 of the capillary. As a gap exists between the second temperature control unit 64 and the guide 75, the second temperature control unit 64 is allowed to move within the range defined by the gap. Closing of the thermostat chamber door 61 brings the presser block 71 into surface contact with the detector 06 so that heat of the heater 70 is efficiently transferred to the detector 06. The detector 06 pressed to the second temperature control unit 64 is further pressed to the irradiation detection unit 42 for positioning of the detector 06.

Figure 7A:
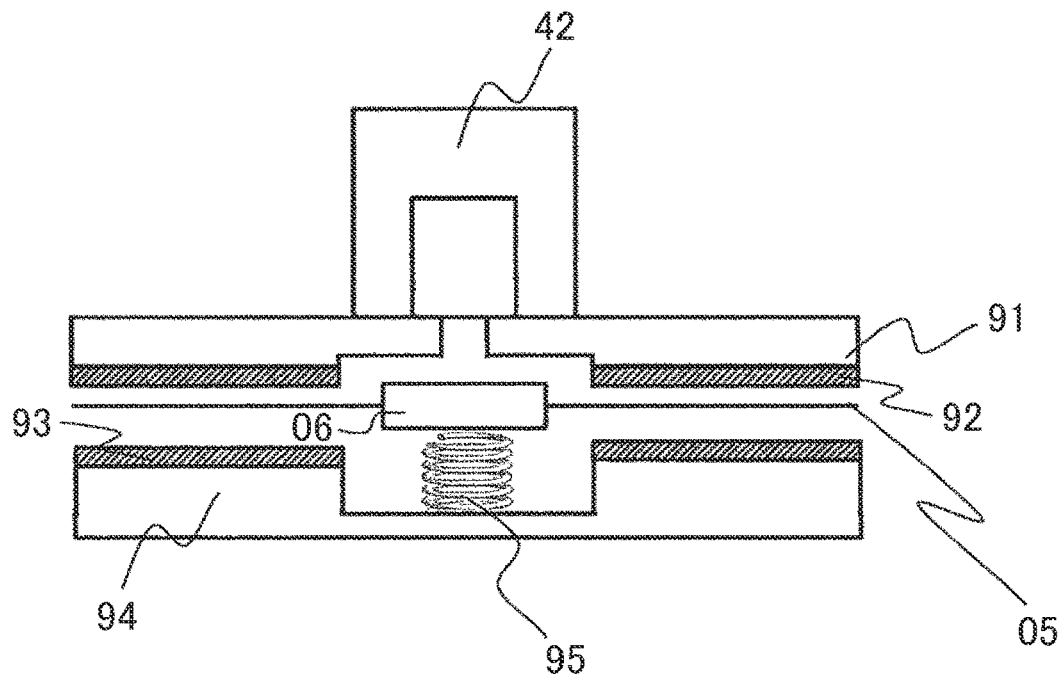
FIG. 7A illustrates a periphery of a generally employed detector.
Figure 7B:
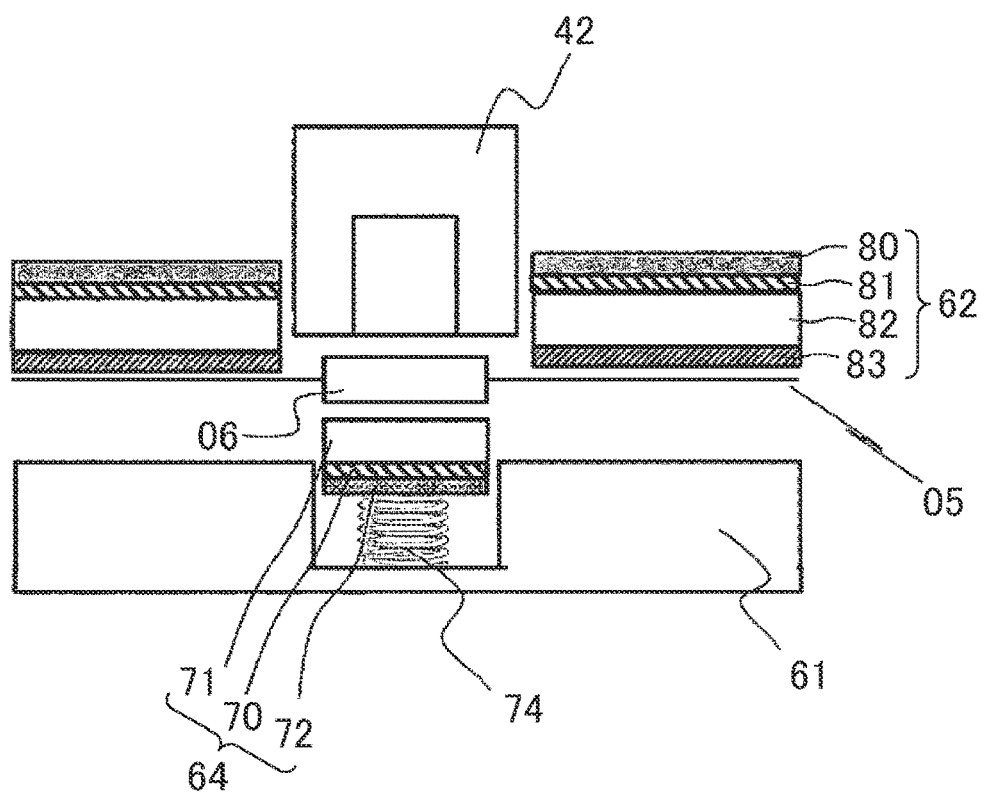
FIG. 7B illustrates a periphery of a detector according to the present invention.
Figure 8A:
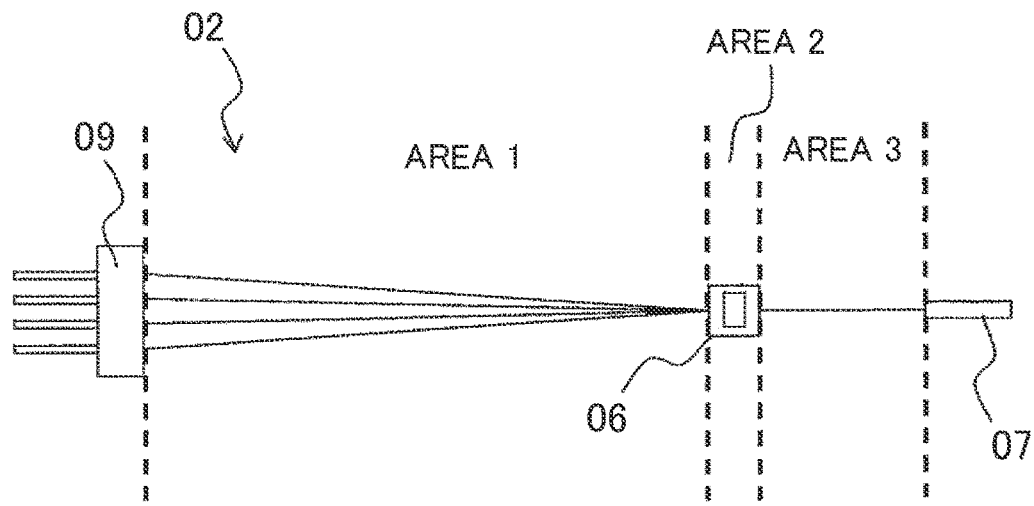
FIG. 8A illustrates temperature sections of a capillary array.
Figure 8B:
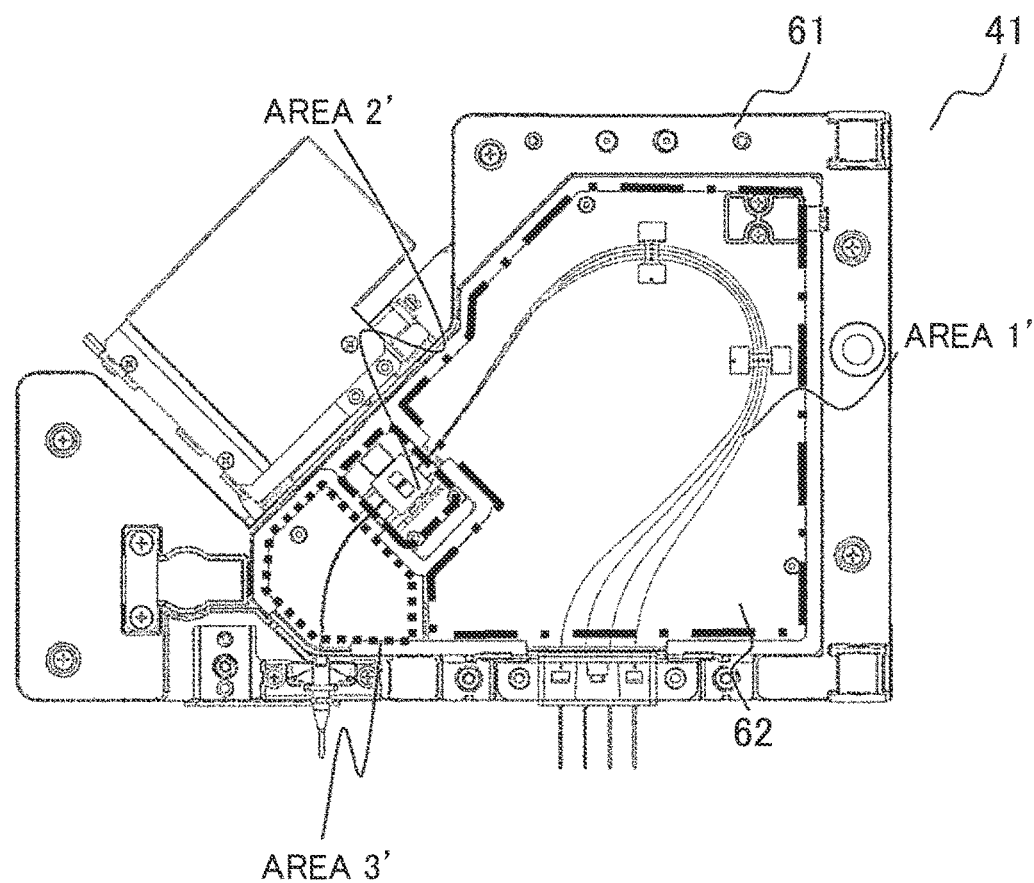
FIG. 8B illustrates an arrangement of the thermostat chamber and the capillary array.

Referring to FIGS. 7A and 7B, temperature control operations around the detector 06 will be described. The capillary 05 and the detector 06 will only be described while omitting description of the support 03 of the capillary cartridge 01 and the like. FIG. 7A illustrates the temperature control operation around the detector as disclosed in Patent Literature 1. The temperature of the capillary 05 around the detector 06 is controlled by heaters (or conductive members) 92, 93 attached to the main body 91 and the cover 94, respectively while being interposed therebetween. Meanwhile, the detector 06 is pressed by the spring 95 attached to the cover 94 toward the irradiation detection unit 42, and is not subjected to the temperature control. The temperature of the detector 06 is lower than that of the capillary around the detector 06 interposed between the heaters 92 and 93. Referring to FIG. 8B, the temperature control operations around the detector 06 according to the present invention will be described. In the present invention, the second temperature control unit 64 having the heater 70 is disposed for directly heating the detector 06 as described above. The spring 74 is disposed between the thermostat chamber door 61 and the second temperature control unit 64. When closing the thermostat chamber door 61, the second temperature control unit 64 presses the detector 06 to the irradiation unit 42 so that the detector 06 comes in contact with the second temperature control unit 64. The detector 06 may be heated by the second temperature control unit 64 from the surface opposite the one at the side where the irradiation detection unit 42 is disposed. The capillary 05 around the detector 06 is heated between the first temperature control unit 62 having the heater 81 as disclosed in Patent Literature 1 and the thermostat chamber door 61. The first temperature control unit 62 will be described later in detail. In the example, the thermostat chamber door 61 includes the second temperature control unit 64 for heating the detector 06. However, the structure may be arbitrarily configured so long as the detector 06 is heated from the surface opposite the one at the side where the irradiation detection unit 42 is disposed. The thermostat chamber door 61 may be provided with the second temperature control unit 64 as described herein. Alternatively, the thermostat chamber base 60 may be provided with an additional attachment member such as a door for attachment of the second temperature control unit 62.

Temperature of the capillary array 02 during electrophoresis and phoresis results will be described. Referring to FIG. 8A, an explanation will be made by defining a section of the capillary array 02 ranging from the electrode holder 09 to the detector 06 is defined as an area 1, the section of the detector 06 as an area 2, the section ranging from the detector 06 to the capillary head 07 as an area 3. The capillary array 02 is disposed in the thermostat chamber unit 41 as illustrated in FIG. 8B. It is assumed that a section of the first temperature control unit for executing the temperature control to the area 1 of FIG. 8A is defined as an area 1', a section where the detector in the area 2 is disposed is defined as an area 2', and a section of the first temperature control unit 62 for executing temperature control to the area 3 is defined as an area 3'. The temperature control to the areas 1 and 3 of the capillary array 02 is executed by the first temperature control unit 62 disposed on the thermostat chamber base 61. As the detector 06 in the area 2 is positioned in the notch 63 of the first temperature control unit 62 onto which the irradiation detection unit 42 is installed, the first temperature control unit cannot execute the temperature control to the detector 06. The temperature control to the detector 06 in the area 2 is executed by the second temperature control unit 64 attached to the thermostat chamber door 61.

Figure 9A:
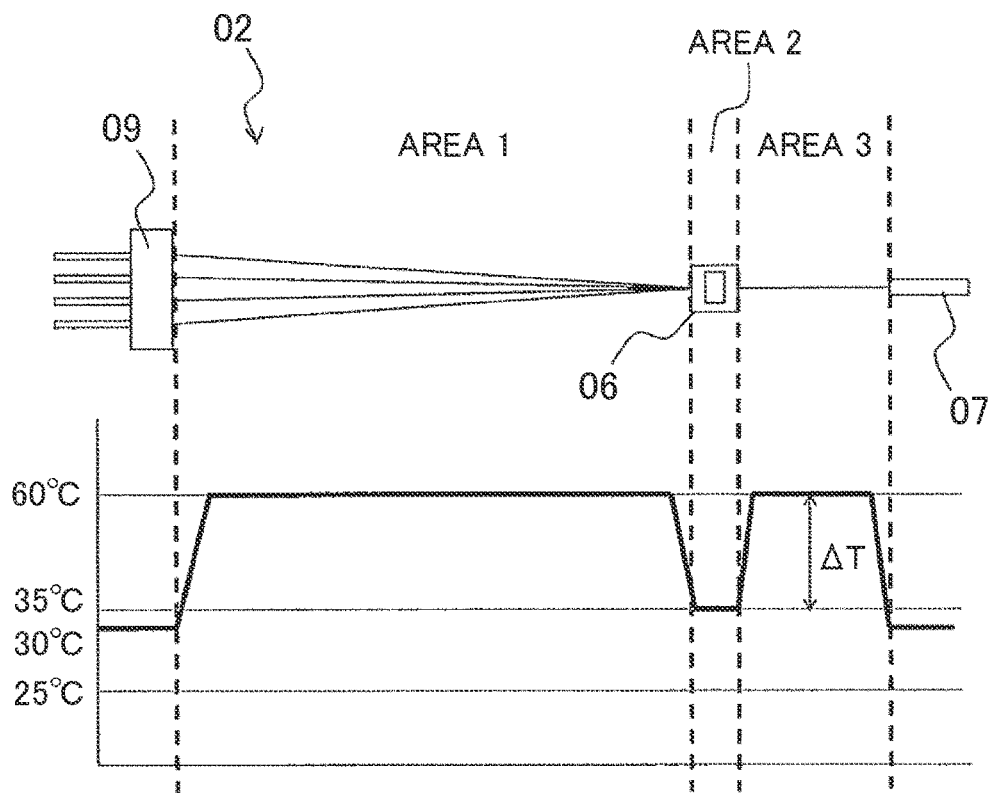
FIG. 9A illustrates a temperature distribution of a generally employed capillary array.
Figure 9B:
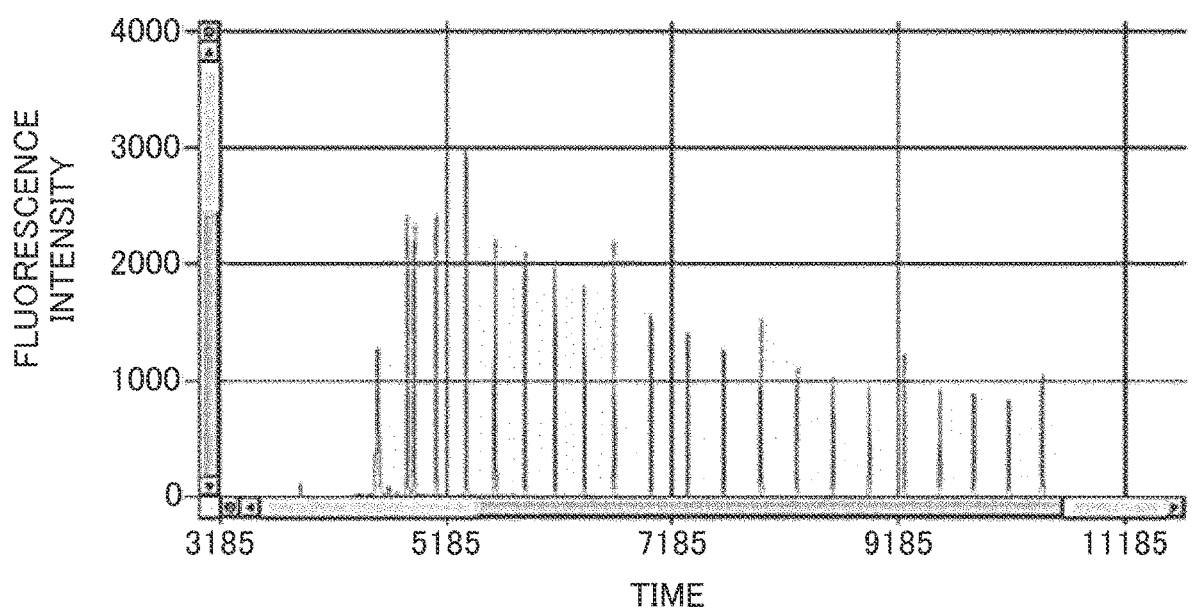
FIG. 9B illustrates results of electrophoresis in the state of the temperature distribution as indicated by FIG. 8A.
Figure 10A:
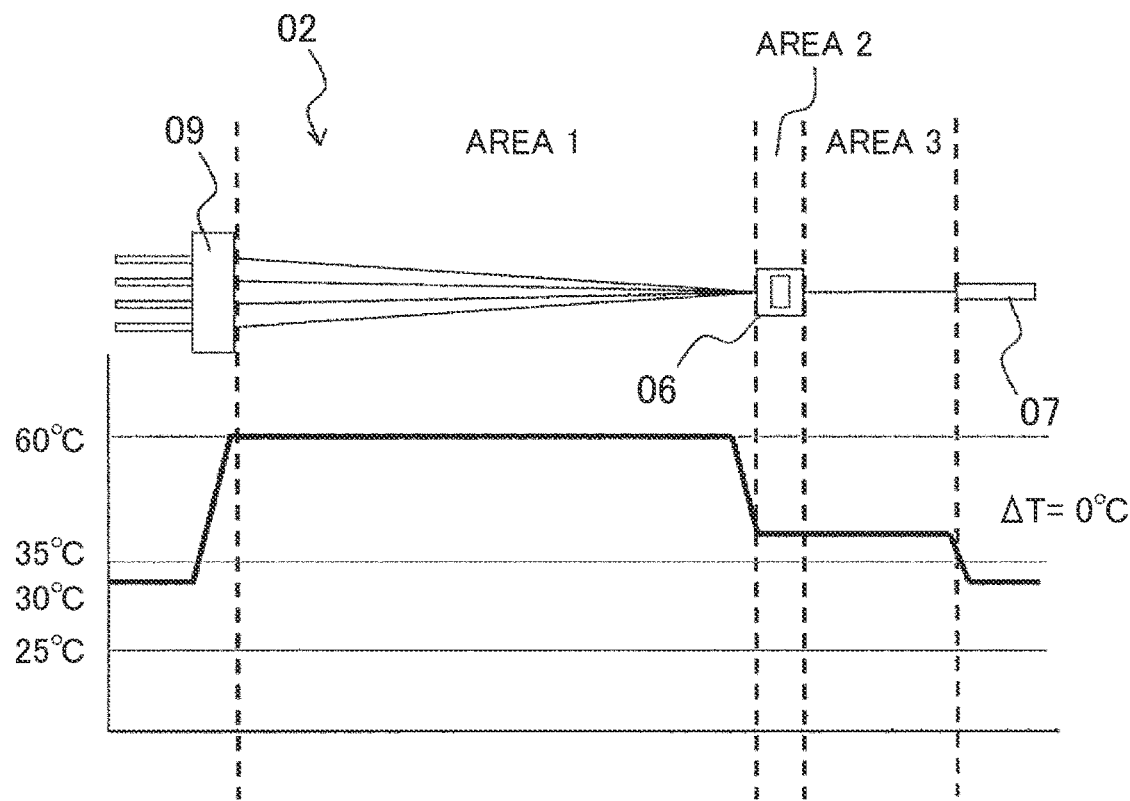
FIG. 10A illustrates a temperature distribution of the capillary array according to the present invention.
Figure 10B:
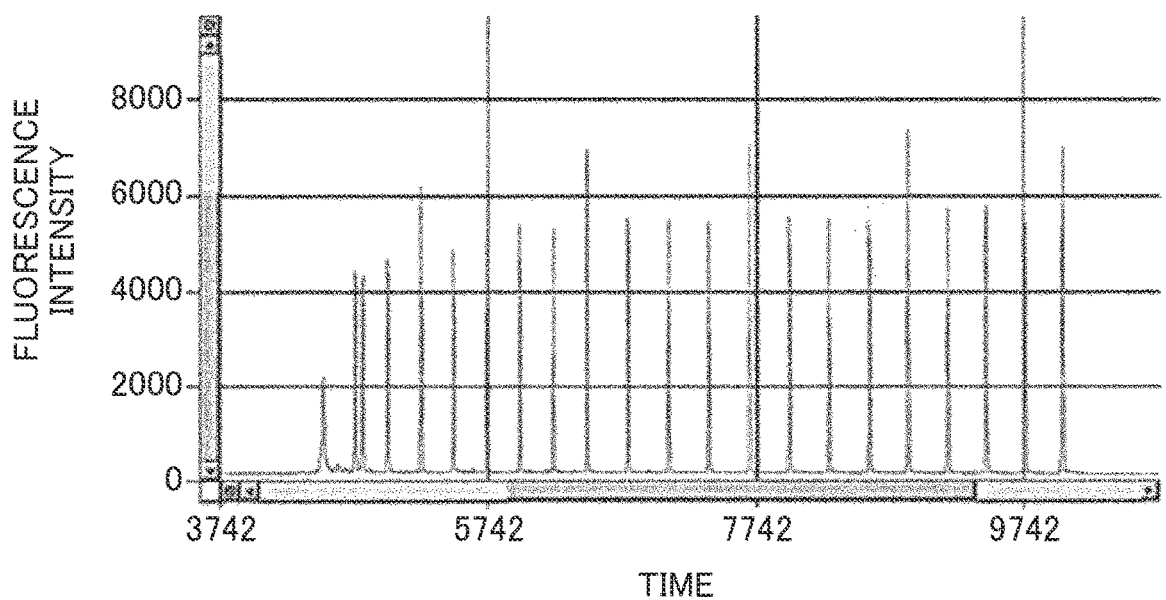
FIG. 10B illustrates results of electrophoresis in the state of the temperature distribution as indicated by FIG. 9A.

FIG. 9A represents the temperature distribution of the capillary array 02 under the temperature control only by the first temperature control unit 64 in the conventional manner when controlling the temperature of the capillary array 02 to 60° C. Both temperatures of the areas 1 and 3 are 60° C. each as the set temperature. The detector 06 in the area 2 is not in contact with the first temperature control unit 64, and is not subjected to the temperature control as described above. The temperature of the area 2 is lower than those of the areas 1 and 3. FIG. 9B represents the phoresis results in the condition as described above. The phoresis results of FIG. 9B indicate the problem that the detected fluorescence intensity is gradually reduced. Reduction in the fluorescence intensity deteriorates detection sensitivity at the long base side, causing the problem of failing to detect minute quantity of sample. Our study dealing with such problem has revealed that the fluorescence intensity reduction is correlated with the temperature difference between the areas 2 and 3 of the capillary array 02, and that as the temperature difference between the areas 2 and 3 becomes smaller, the fluorescence intensity becomes more uniform. FIG. 10A represents the temperature distribution of the capillary array 02 under the condition in which the temperature difference between the areas 2 and 3 is set to be smaller. FIG. 10B represents the phoresis results in the state of the temperature distribution of the capillary array 02 as indicated by FIG. 10A. The phoresis results of FIG. 10B indicate that the fluorescence intensity is kept uniform rather than being reduced. It is clarified that the fluorescence intensity becomes uniform by reducing the temperature difference between the areas 2 and 3. It is preferable to make the temperature difference between the areas 2 and 3 as small as possible. If the temperature difference is 7° C. or lower, practically uniform signal intensity may be obtained. Preferably, each temperature of the areas 2 and 3 is approximately 45° C. Excessively low temperatures of the areas 2 and 3 may cause the risk of deteriorating the sample separation ability, or prolong the separation time. Higher outputs will be required to uniformize the areas 1, 2, 3 at high temperatures. It is therefore preferable to set the respective temperatures of the areas 2 and 3 to approximately 45° C.

In the case where the temperature propagation member for propagating heat of the first temperature control unit 62 to the detector as disclosed in Patent Literature 2, the temperature in the area 2 is increased in comparison with the case where the temperature control is not executed as indicated by FIG. 9A. Although little effect of preventing the fluorescence intensity reduction is obtained, the use of the temperature propagation member cannot heat the detector 06 sufficiently, failing to uniformize the fluorescence intensity. It is necessary to provide the second temperature control unit 64 according to the present invention for reducing the temperature difference between the areas 2 and 3 for accurately heating with higher outputs rather than heating of the detector 06 through propagation of heat of the first temperature control unit 62.

Figure 11:
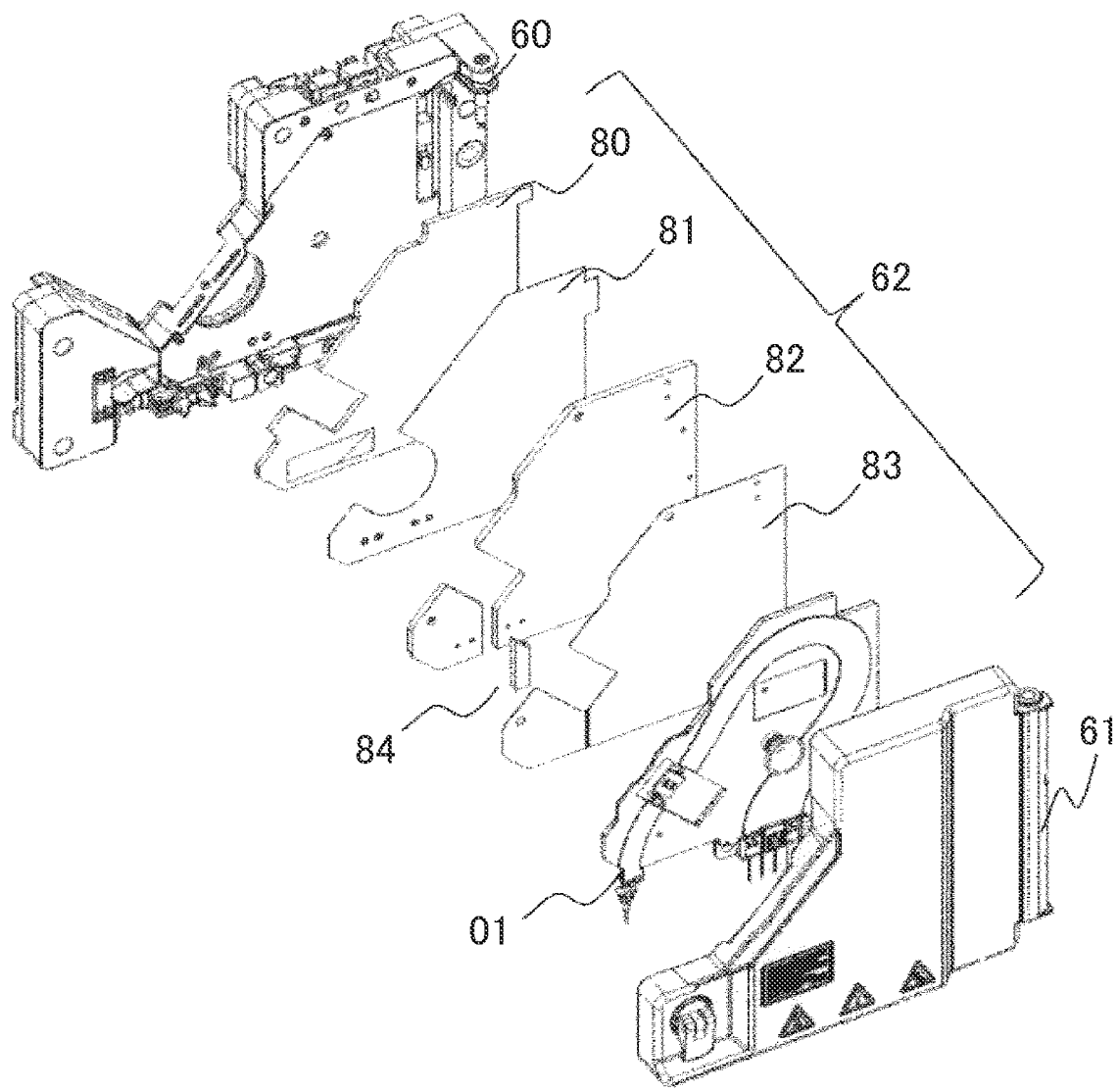
FIG. 11 illustrates a structure of a first temperature control unit.

Referring to FIG. 11, an explanation will be made with respect to the first temperature control unit 62 having the high temperature area 1' and the low temperature area 3' for the purpose of heating the area 1 of the capillary array 02 to high temperature, and heating the area 3 to low temperature, respectively. FIG. 11 illustrates the first temperature control unit 62 separated from the thermostat chamber base 60 for easy understanding.

The first temperature control unit 62 includes a heat insulating sheet 80, a heater 81, a heat transfer plate 82, and a heat conduction sheet. Those members are fixed with one another through bonding, welding, screwing, and the like.

Figure 12:
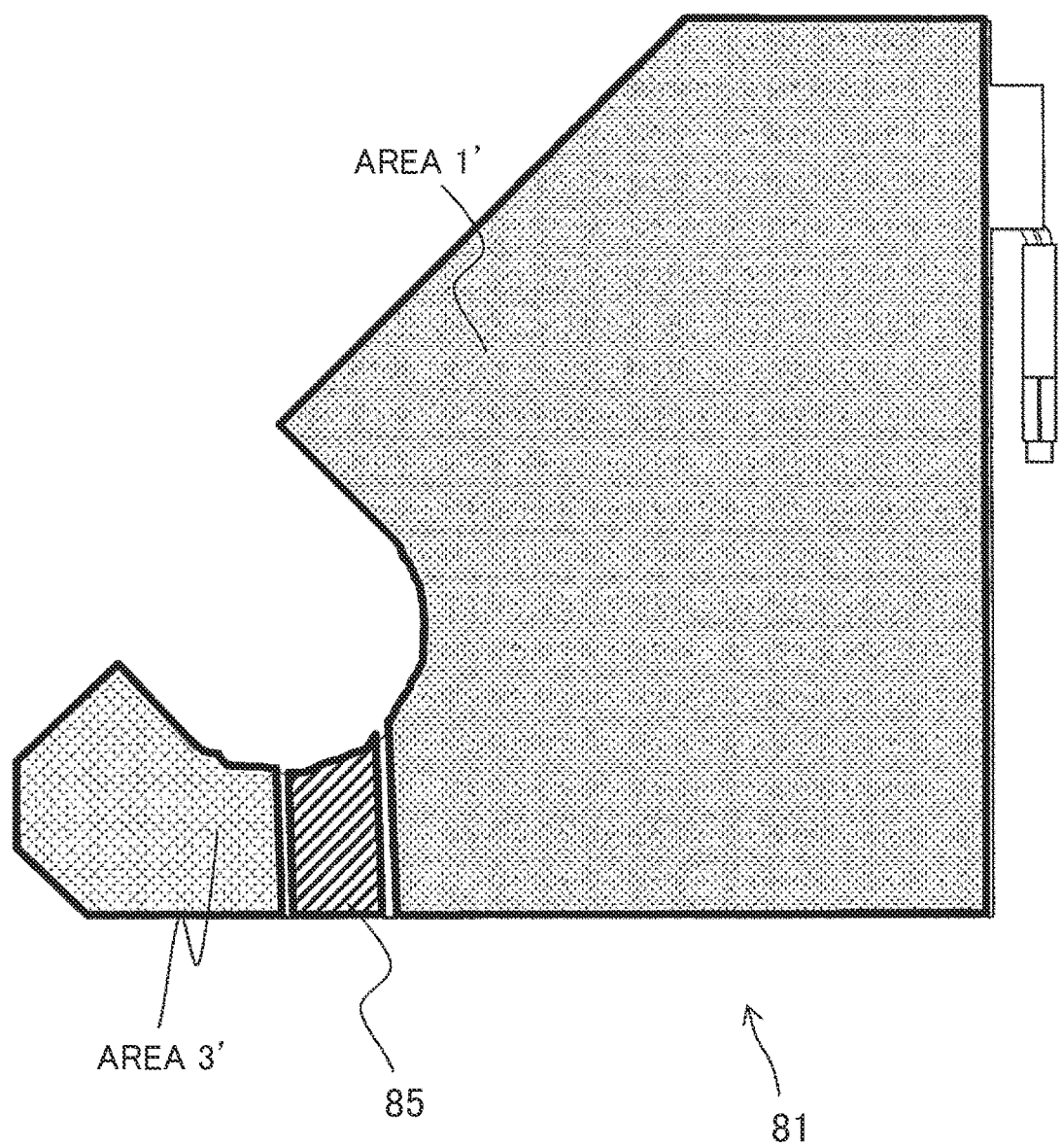
FIG. 12 illustrates a heater of the first temperature control unit.
Figure 13A:
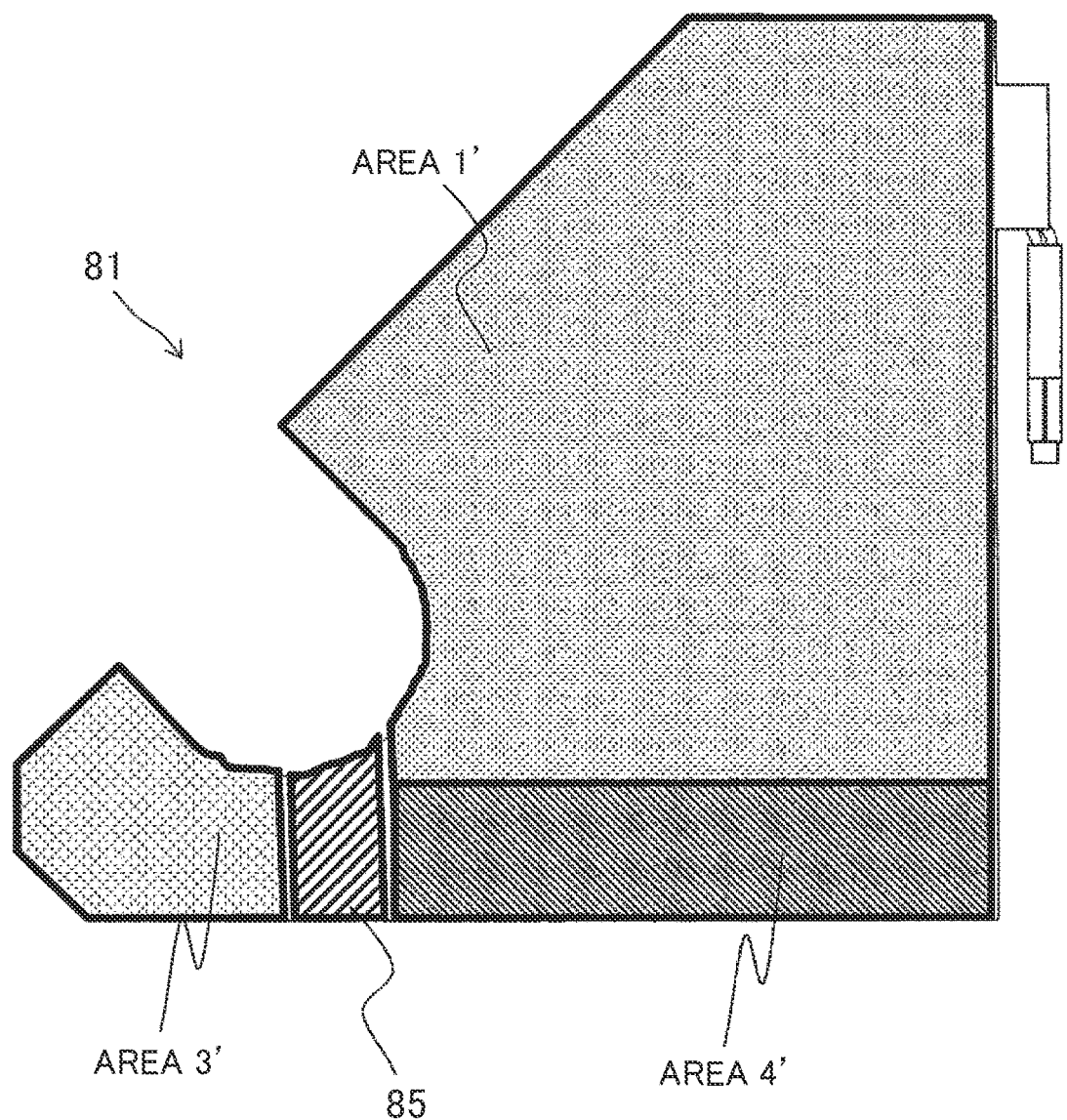
FIG. 13A illustrates an example of a heater of a first temperature control unit of a second example.
Figure 13B:
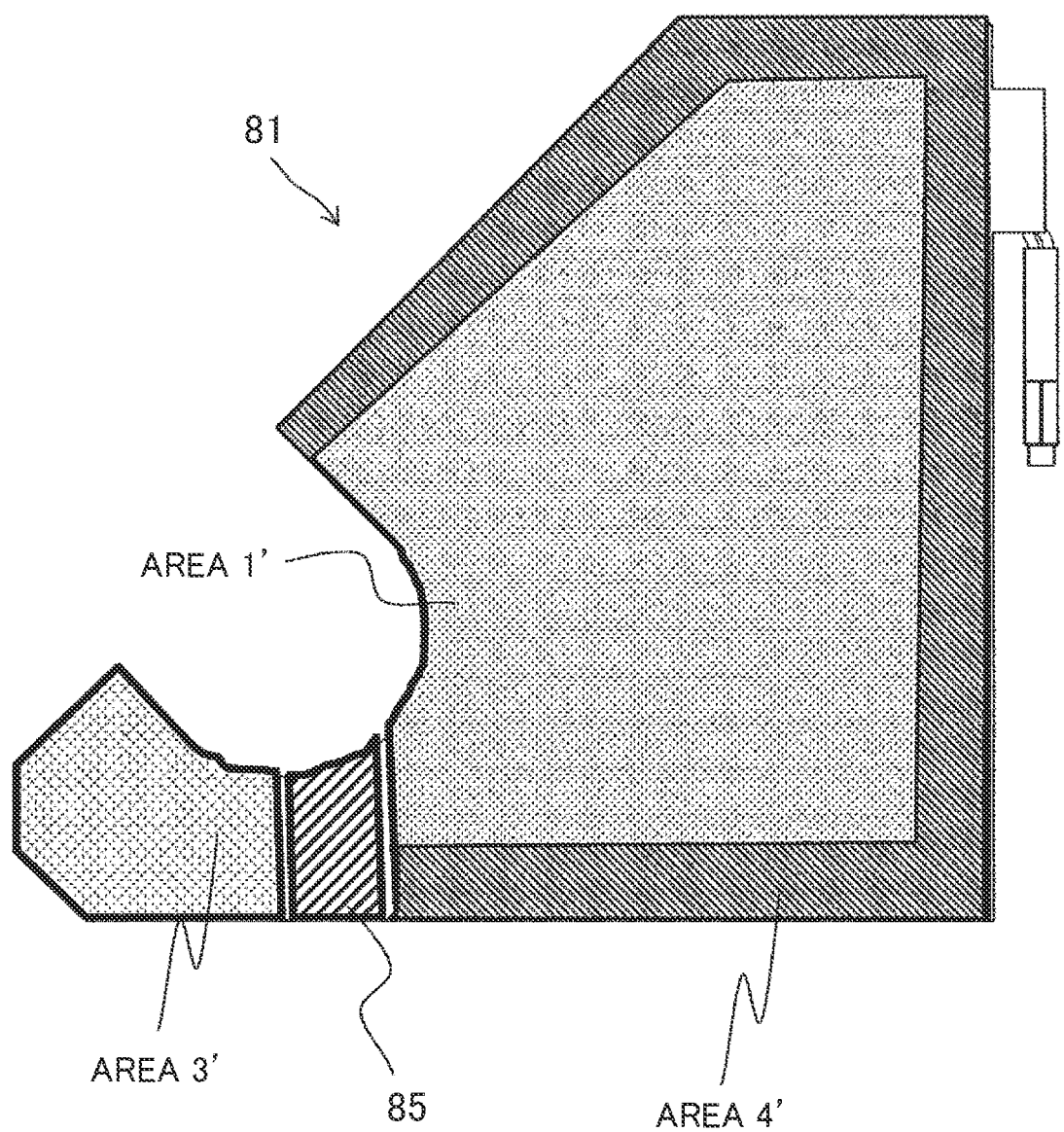
FIG. 13B illustrates an example of a heater of the first temperature control unit of the second example.

The heater 80 has the high-temperature area 1' and the low-temperature area 3' for heating the areas 1 and 3 of the capillary array 02 to high temperature and low temperature, respectively (see FIG. 12). A non-heating region 85 is set between the areas 1' and 3' so as to prevent transfer of temperature of the area 1' to the area 3'. Although not shown, the heater 81 has a heating resistor wire on the base member such as polyimide film, silicon rubber, and ceramic. The heating amount may be adjusted in accordance with thickness of the heating resistor wire, and density of arranged heating resistor wires. Low density arrangement reduces the heating amount to allow the single heater 81 to have both the high temperature region and the low temperature region. In the example, the single heater 81 is used. However, it is possible to provide different heaters corresponding to the areas 1' and 3', respectively. The heating amount of the heater may be divided in three or more stages in accordance with heat radiation amount without being limited to two stages.

The heat generated by the heater 81 is transferred to the capillary 05 in the capillary cartridge 01 via the heat transfer plate 82 and the heat conduction sheet 83 for heating the capillary 05. The first temperature control unit 62 has the heat insulating sheet 80 at the side of the thermostat chamber base 60. The heat transfer plate 82 is provided to spread heat generated by the heater 81 to the heat conduction sheet 83 uniformly. It is preferable to use high heat conductive metal, for example, aluminum and copper for forming the heat transfer plate 82. The heat conduction sheet 83 is required to transfer heat generated by the heater to the capillary 05 efficiently. Preferably, the heat conduction sheet 83 exhibits excellent heat transfer property. Preferably, the heat conduction sheet is made of a soft material so as not to damage the capillary 05 in contact with the heat conduction sheet. The order of arrangement of the heat transfer plate 82 and the heater 81 may be reversed so that members of the first temperature control unit 62 are arranged in the order of the heat insulating material 81, the heat transfer plate 82, the heater 81, and the heat conduction sheet 83.

In order to heat the areas 1 and 3 of the capillary array 02 to high temperature and low temperature, respectively, the heat transfer plate 82 has to be separated into the areas 1' and 3' as well as the heater 81. Even in the case where the heater 81 has the high temperature region and the low temperature region, if the heat transfer plate 82 has no separated areas for the high temperature region and the low temperature region, the heat in the high temperature region is transferred to the low temperature region. This may increase the temperature of the low temperature region. The heat transfer plate 82 according to the present invention is divided into the areas 1' and 3'. Preferably, a heat insulation block 84 is provided between the areas 1' and 3' of the heat transfer plate 82 so as not to propagate the heat of the area 1' to the area 3'.

A temperature sensor such as a thermistor of the first temperature control unit 62 serves to execute temperature control of the heater 81. The not-shown thermistor may be attached to any one of the heat insulating sheet 80, the heater 81, the heat transfer plate 82, and the heat conduction sheet. However, it is preferable to attach the thermistor to a heat radiation rubber 64 in contact with the capillary 05. In the case of using the single heater 81 as described herein, the areas 1' and 3' may be subjected to the temperature control in common. The temperature control may be executed less costly compared with the use of two heaters.

Second Example

In the first example, the heater 81 is configured to divide the heating amount in two stages in the areas 1' and 3'. It is possible to divide the heating amount of the heater 81 in three or more stages. The structures of a second example are the same as those of the first example except the heater 81.

FIG. 12A illustrates the heater 81 of the example. As the thermostat chamber unit 41 is not sealed completely, it may be influenced by the environmental temperature. Especially, as the capillary head 07 and the electrode holder 09 extend outside of the thermostat chamber unit 41 from the lower side of the areas 3' and 4', the thermostat chamber unit 41 is slightly opened. Therefore, the lower side of the first temperature control unit 62 is likely to be influenced by the environmental temperature. The heater of the example has the area 4' below the area 1', which generates heat more than heat generated by the area By increasing the heating amount of the area 4' with large heat radiation amount, the detector 06 may be heated uniformly from the electrode holder 09 of the capillary array 02. As FIG. 12B illustrates, it is possible to provide the area 4' with larger heating amount than that of the area 1' so that the area 1' is surrounded as well as the lower section.

Third Example

In the first example, the second temperature control unit 64 is used for heating the detector 06 from the surface opposite the one at the side where the irradiation detection unit 42 is disposed. In this example, an explanation will be made with respect to an example that the irradiation detection unit 42 is provided with a heater for heating the detector 06 from the side of the irradiation detection unit 42 referring to FIGS. 14A and 15B.

Figure 14A:
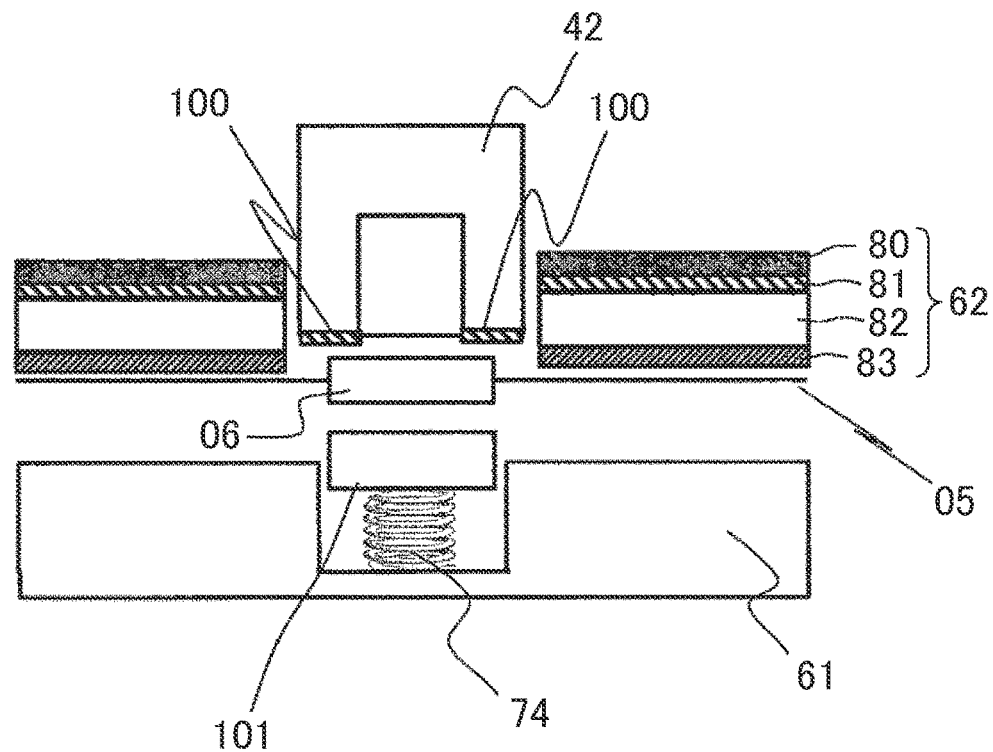
FIG. 14A illustrates an example of a periphery of a detector of a third example.
Figure 14B:
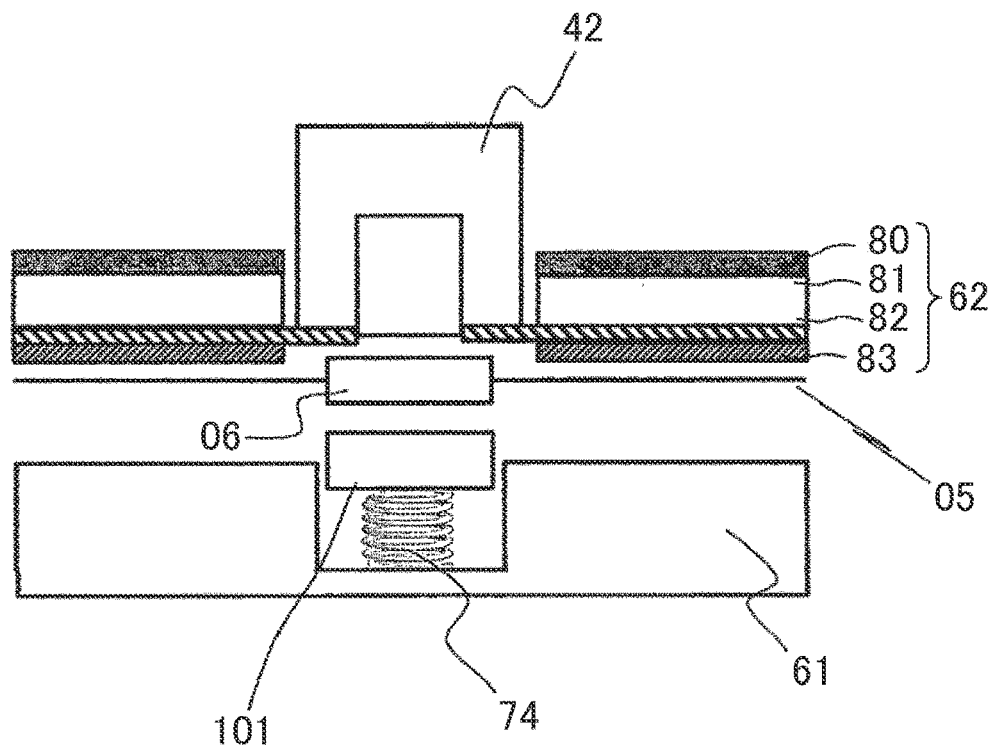
FIG. 14B illustrates an example of a periphery of a detector of the third example.

FIG. 14A illustrates a temperature control operation around the detector according to the example. The structure of the example is similar to that of the first example except that the thermostat chamber door 61 is provided with a detector presser 101 instead of the second temperature control unit, and the irradiation detection unit 42 is provided with a heater 100. In the present invention, the detector 06 is heated by the heater 100 of the irradiation detection unit 42 rather than the second temperature control unit 64 of the thermostat chamber door 61. The heater 100 attached to the irradiation detection unit 42 is located at the position besides the one on which the fluorescence from the detector 06 is incident. The heater 100 is fixed to the detection unit 42 through bonding, welding, screwing, and the like. When closing the thermostat chamber door 61, the detector presser 101 of the thermostat chamber door 61 presses the detector 06 to the irradiation detection unit 42. The detector 06 comes in contact with the heater 100 of the irradiation detection unit 42 so that the detector 06 is heated by the heater 100. The detector 06 is pressed by the detector presser 101. However, the detector 06 may be directly pressed by the spring 74 to the irradiation detection unit 42. As the heater 100 is attached to the detection unit 42, the heater 100 is brought into direct contact with the casting section of the detection unit 42. Accordingly, higher outputs are required as the temperature is likely to be reduced. However, the detector may be heated with simple structures. In order to heat the detector 06 from the side of the irradiation detection unit 42, the heater attached to the irradiation detection unit 42 may be shared with the first temperature control unit 62 as illustrated in FIG. 14B without providing an additional heater for heating the detector 06.

LIST OF REFERENCE SIGNS

01: capillary cartridge, 02: capillary array, 03: support, 04: sheet, 05: capillary, 06: detector, 07: capillary head, 08: electrode (cathode), 09: electrode holder, 10: separator, 11: holder, 20: autosampler unit, 21: sampler base, 22: X-axis driver, 23: Y-axis driver, 24: Z-axis driver, 25: sample tray, 26: sample container, 27: liquid feeding mechanism, 28: electrophoresis medium container, 29: anode-side buffer solution container, 30: anode-side washing tank, 31: anode-side electrophoresis buffer solution chamber, 32: anode-side sample introduction buffer solution chamber, 33: cathode-side buffer solution container, 34: waste liquid tank, 35: cathode-side washing tank, 36: cathode-side electrophoresis buffer solution chamber, 40: irradiation detection/thermostat chamber unit, 41: thermostat chamber unit, 42: irradiation detection unit, 43: electrode (anode), 51: electrode holder positioning pin, 52: electrode holder positioning hole, 53: support leg, 54: support stage, 55: support insert port, 56: insert, 60: thermostat chamber base, 61: thermostat chamber door, 62: first temperature control unit, 63: notch, 64: second temperature control unit, 70: heater, 71: presser block, 72: base plate, 73: antireflection sheet, 74: spring, 75: guide, 80: heat insulating sheet, 81: heater, 82: heat transfer plate, 83: heat conduction sheet, 84: heat insulation block, 85: non-heating region, 91: main body, 92: heater, 93: heater, 94: cover, 95: spring, 100: heater, 101: detector presser

The invention claimed is:

1. An electrophoresis device, comprising:
 a capillary array including a capillary, a capillary head for bundling an end of the capillary, an electrode holder for holding an electrode provided at the other end of the capillary, and a detection portion provided for the capillary;
 a first heater for heating the capillary;
 a second heater;
 an irradiation detection unit that irradiates light to the detection portion, and detects fluorescence generated from a fluorescence labelled sample in the capillary; and
 a casing which includes a main body and a door member,
 wherein the first heater is attached to the main body,
 wherein a spring is disposed below the detection portion and is attached to the door member and a base plate,
 wherein a presser block is disposed below the detection portion, and
 wherein the second heater is disposed between the presser block and the base plate.

2. The electrophoresis device according to claim 1, wherein the first heater includes a first heat source, and a heat transfer plate for transferring heat of the first heat source to the capillary.

3. The electrophoresis device according to claim 2, wherein the first heat source includes a first region and a second region, each having a different heating amount, and
 wherein the heating amount of the second region is larger than that of the first region.

4. The electrophoresis device according to claim 3, wherein the first region comes in contact with a section ranging from the detection portion to the capillary head, and
 wherein the second region comes in contact with a section ranging from the electrode holder to the detection portion.

5. The electrophoresis device according to claim 3, wherein the heat transfer plate includes a first heat transfer plate which comes in contact with a high temperature section, and a second heat transfer plate which comes in contact with a low temperature section.

6. The electrophoresis device according to claim 5, wherein a heat insulating material is disposed between the first heat transfer plate and the second heat transfer plate.

7. The electrophoresis device according to claim 1, wherein an antireflection sheet is applied to a surface of the presser block, which comes in contact with the detection portion.

8. The electrophoresis device according to claim 1, wherein an area of a surface of the presser block, which comes in contact with the detection portion, is equivalent to an area of the detection portion.

9. The electrophoresis device according to claim 1, wherein the door member is provided with a guide for the second heater.

10. The electrophoresis device according to claim 1, further comprising a support for fixing the capillary array.

11. The electrophoresis device according to claim 10, wherein the support includes a holder.

12. The electrophoresis device according to claim 1, wherein the first heater has a notch for placing the irradiation detection unit, and
 wherein the detection portion is positioned at the notch.

13. The electrophoresis device according to claim 1, wherein the detection portion is disposed between the irradiation detection unit and the second heater.

* * * * *